United States Patent

[11] 3,631,627

| [72] | Inventor | Jacobus Leendert Van Zijverden<br>Dreef 4, Bennebroek, Netherlands |
|---|---|---|
| [21] | Appl. No. | 868,453 |
| [22] | Filed | Oct. 22, 1969 |
| [45] | Patented | Jan. 4, 1972 |
| [32] | Priority | Oct. 24, 1968 |
| [33] | | Netherlands |
| [31] | | 6815184 |

[54] FORCING BOXES FOR BULB PLANTS
6 Claims, 2 Drawing Figs.

[52] U.S. Cl. ................................................. 47/34
[51] Int. Cl. ................................................. A01g 9/02
[50] Field of Search ................................................. 47/34, 38–38.1, 37, 1.2

[56] References Cited
UNITED STATES PATENTS

| 231,086 | 8/1880 | Pimley | 47/34 |
| 1,391,353 | 9/1921 | Wells | 47/34 |
| 1,773,020 | 8/1930 | Willis | 47/38 |
| 2,057,972 | 10/1936 | Pieck | 47/34 |
| 2,138,188 | 11/1938 | Morley | 47/34 |
| 2,550,602 | 4/1951 | Rothe | 47/34 |

FOREIGN PATENTS

| 201,968 | 4/1955 | Australia | 47/38 |
| 1,717 | 1904 | Great Britain | 47/34 |
| 342,399 | 12/1959 | Switzerland | 47/38 |

*Primary Examiner*—Robert E. Bagwill
*Attorney*—Holman & Stern

ABSTRACT: A forcing box for plants, particularly plants of the bulb variety in which a tubular body is provided with an open lower end and an upper end wall having a central opening for allowing a shoot of the bulb to project therethrough to the exterior of the body, with the lower end resting in a cover having an upstanding peripheral wall spaced from and surrounding the lower portion of the body, and at least the cover having means for spacing the lower end of the body from the cover to provide a slot for allowing water introduced into the cover to enter the interior of the body via the slot.

PATENTED JAN 4 1972  3,631,627

INVENTOR
JACOBUS LEENDERT VAN ZIJVERDEN

BY Holman, Glascock, Downing & Seebold
ATTORNEYS

FORCING BOXES FOR BULB PLANTS

BACKGROUND OF THE INVENTION

The invention relates to a forcing box for plants, particularly of the bulb variety, mainly consisting of a hollow body of which the upper wall is at least provided with a central opening for the shoot or sprout of a bulb to extend therethrough and which is closed at the lower end by a cover surrounding the lower rim of the body and secured to the body by snap fastening means.

Such a forcing box is already known in which the box has an upper wall which is bent out upwardly and is mainly defined by a narrow ring lying above the top plane of the box and connected with the upper edge of the pot by narrow connecting strips, so that large apertures are formed between the ring and the upper edge of the upstanding sidewall portion of the box for allowing water to be poured from above. At the lower end the body is closed by a flat cover plate which has to fit closely in a watertight manner around the lower margin of the body for preventing water leakage. On the other hand, for preventing excessive watering, at some distance above the cover, draining slots are provided in the body walls. Such a construction has the drawback that soil or the like can readily fall out of the body if it is inverted, for instance during transport, or if the body assumes a lying position. Moreover, the cover generally will not seal in a completely watertight manner so that the chance of water leakage is rather great. Therefore, such a box must always be placed on a saucer or other watertight container, particularly if an excess of water has been introduced as the lateral draining slots will discharge the water to the outside.

The invention aims at overcoming these drawbacks.

SUMMARY OF THE INVENTION

According to the invention, this is obtained in that the cover is provided with a free upturned edge and completely surrounds the body at the lower side with the cover and body coacting to define a slot. Such a box can be supplied with water between the upturned edge of the cover and the sidewall of the body, after which the water enters interior of the body through the slot between the cover and the body. With this construction, an over supply of water is rather difficult because the space between the upturned edge of the cover and the sidewall of the body can take up the water which has to be absorbed in the soil. In addition, the cover serves at the same time as a receptacle for a possible excess of water and placing of the body on an additional saucer or the like is no longer necessary, while spoiling of water is rendered practically impossible. Since the level of the water in the body is visible at the inside of the upturned edge of the cover, this functions at the same time in a preventive manner against over watering. Additional draining slots for an excess of water are no longer necessary while, in addition, the plant receives water in a favorable manner from therebelow. This means that the upper wall of the body can be fully closed except for an opening for the shoot or sprout of the bulb, so that a loss of soil when the forcing box is inverted or transported in a lying position, is substantially impossible. With this construction the upper wall of the box no longer needs to be bent out upwardly and advantageously, on the contrary, is displaced a little downwardly with respect of the plane of the upper edge of the body wall while the edge of the central opening is inclined upwardly. In this way, the box can also be placed with the upper end downwardly, if necessary.

In practice, the construction is advantageously made in such a manner, that the bottom of the cover and the lower edge of the body are spaced a small distance apart by stop members so as to assure a passage slot for water of adequate width substantially thereabout.

For promoting ventilation of the lower part of the box further advantageously possesses a number of small perforations around the central opening with the perforations being so small that no loss of soil can take place therethrough.

For protecting the sprout or shoot of the bulb during transport, generally a sleeve of some adequate material can be slipped on the box, with the sleeve surrounding the sprout and protecting it against damage. In this connection, the upstanding wall of the box body is provided with a circumferential shoulder which limits the extent to which the protecting sleeve can be slipped on and against which the sleeve is well supported throughout its perimeter.

The invention will now be further elucidated with reference to an example shown in the drawing. In the drawing:

DETAILED DESCRIPTION OF THE INVENTION

Figure 1:
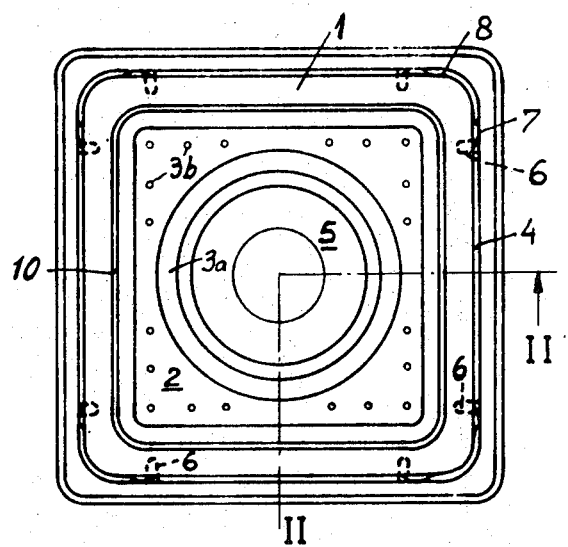
FIG. 1 is a view in top elevation of a forcing box according to the invention.
Figure 2:
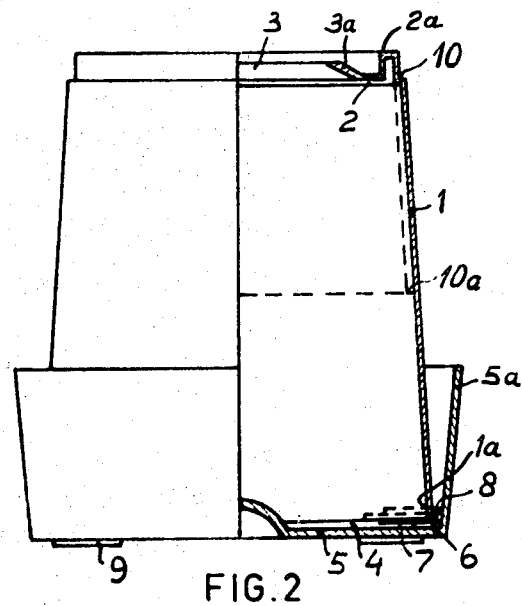
FIG. 2 is a view taken along line II—II in FIG. 1.

The forcing box includes a tubular body 1 of generally truncated pyramidal shape having an open lower end 1a and an upper end 2a. The upper end 2a is provided with a wall 2 located below or recessed within the upper end and such wall has a central opening 3 whose edge 3a is inclined upwardly and inwardly as illustrated in FIG. 2. The opening 3 allows a shoot or sprout of a bulb placed within the box to project or extend therethrough. The upper wall 2 of the box is further provided with small perforations 3b around the central opening 3 for ventilation purposes. At the open lower end 1a, the body 1 is closed by a cover 5 surrounding the lower end of the body, with the body and cover cooperating to provide a rather narrow slot 4 extending substantially thereabout. The cover 5 is also of truncated pyramidal shape and has a somewhat diverging upturned sidewall 5a, which facilitates the introduction of water between the sidewall of the box and the sidewall of the cover.

The box and the cover appropriately both consist of somewhat resilient synthetic material and, for providing the passage slot 4 along the lower edge of the pot, the base of the cover 5 is provided with internally directed projections 6 at the corners while the lower edge of the body 1 is provided with projecting corner rims 7 which can snap under ribs 8 arranged at an adequate distance above the base of the cover. The base of the cover is further provided with narrow ribs 9 at the outer side thereof, enabling ventilation under the base of the cover.

The upper portion of the wall of the body 1 is provided with a shoulder 10 along its perimeter, on which a protecting sleeve (not shown) for the shoot or sprout of a bulb which is placed in the forcing box can be arranged. This shoulder, however, can also be arranged at a lower level as is indicated at 10a in dotted lines. The sleeve can then be arranged on the pot in a more secure and stable manner.

In the drawing the box is shown having a square cross section, but it can also be of a round or another angular cross section. With a round box, the stop members for assuring the snapping attachment of the body and cover and the formation of the water passage slots are arranged at regular distances from one another.

I claim:

1. A forcing box, particularly for plants of the bulb variety, comprising a tubular body having an open lower end and an upper end wall, said upper end wall being provided with a central opening through which a shoot of a bulb placed within the body may pass to the exterior of the body, a cover having a base and an upturned sidewall upon the base of which the open lower end of the body rests, and means on the base of the cover to space the lower end of the body therefrom for providing a slot whereby water introduced into the cover may enter the interior of the body.

2. The forcing box as claimed in claim 1 in which said tubular body is of truncated pyramidal shape.

3. The forcing box as claimed in claim 1 in which said lower end of the body and said cover are provided with complemental means constituting a snap action connection between the body and cover.

4. The forcing box as claimed in claim 1 in which said means for providing a slot are stop members arranged in such a manner as to provide open passages between the body and cover.

5. The forcing box as claimed in claim 1 in which the upper end wall of the body is provided with small perforations around the central opening for ventilation.

6. The forcing box as claimed in claim 1 in which the wall of the body is provided with a circumferential shoulder for limiting the extent to which a protecting sleeve for the sprout of the bulb can be slipped on on the body.

* * * * *